United States Patent
Wu et al.

(10) Patent No.: US 10,533,113 B2
(45) Date of Patent: Jan. 14, 2020

(54) SOL-GEL HYBRID COATING COMPOSITION, COATING PROCESS AND COMPOSITE COATING LAYERS

(71) Applicant: HEWLETT-PACKARD DEVELOPMENT COMPANY, L.P., Houston, TX (US)

(72) Inventors: Kuan-Ting Wu, Taipei (TW); Yu-Chuan Kang, Taipei (TW); Chi-Hao Chang, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 22 days.

(21) Appl. No.: 15/758,130

(22) PCT Filed: Oct. 30, 2015

(86) PCT No.: PCT/CN2015/093339
§ 371 (c)(1),
(2) Date: Mar. 7, 2018

(87) PCT Pub. No.: WO2017/070922
PCT Pub. Date: May 4, 2017

(65) Prior Publication Data
US 2018/0244949 A1 Aug. 30, 2018

(51) Int. Cl.
*C09D 127/12* (2006.01)
*C09D 175/04* (2006.01)
(Continued)

(52) U.S. Cl.
CPC ....... *C09D 175/04* (2013.01); *C08G 18/4854* (2013.01); *C09D 1/00* (2013.01);
(Continued)

(58) Field of Classification Search
CPC ...... C09D 175/08; C09D 175/04; C09D 1/00; C09D 7/61; C08K 5/5415; C08L 33/12; C08L 27/18; C08L 27/16; C08L 33/08
See application file for complete search history.

(56) References Cited

U.S. PATENT DOCUMENTS 4,400,408 A    8/1983  Asano et al.
4,753,827 A *  6/1988  Yoldas ................. C09D 183/04
                                                    427/387
(Continued)

FOREIGN PATENT DOCUMENTS

CN    1753958 A      3/2006
CN    102677053 A    9/2012
(Continued)

OTHER PUBLICATIONS https://en.wikipedia.org/w/index.php?title=Titanium_isopropoxide&oldid=526511015 (Year: 2012).*
(Continued)

*Primary Examiner* — Satya B Sastri
(74) *Attorney, Agent, or Firm* — HPI Patent Department

(57) ABSTRACT

This disclosure provides a sol-gel hybrid coating composition, comprising a sol-gel precursor, a polymer and a solvent, wherein the sol-gel precursor comprises tetraethyl orthosilicate and the polymer comprises polyurethane and polyacrylic. This disclosure also provides a coating process, comprising: subjecting a light metal to micro-arc oxidation treatment to form a first protection layer on the light metal, and coating the sol-gel hybrid coating composition onto the first protection layer to form a second protection layer. This disclosure further provides composite coating layers, comprising: a first layer obtained by micro-arc oxidation treatment, and a second layer obtained by dip coating with the sol-gel hybrid coating composition.

19 Claims, 1 Drawing Sheet

(51) Int. Cl.
  *C09D 133/00* (2006.01)
  *C08K 5/5415* (2006.01)
  *C09D 1/00* (2006.01)
  *C08G 18/48* (2006.01)
  *C09D 175/08* (2006.01)
  *C09D 7/61* (2018.01)
  *C08K 3/08* (2006.01)
  *C08L 25/06* (2006.01)
  *C08L 27/06* (2006.01)
  *C08L 27/16* (2006.01)
  *C08L 27/18* (2006.01)
  *C08L 33/08* (2006.01)
  *C08L 55/02* (2006.01)
  *C08L 63/00* (2006.01)
  *C08L 69/00* (2006.01)
  *C08L 77/00* (2006.01)
  *C08L 79/08* (2006.01)

(52) U.S. Cl.
  CPC .... *C09D 175/08* (2013.01); *C08K 2003/0806* (2013.01); *C08K 2003/0812* (2013.01); *C08K 2003/0856* (2013.01); *C08K 2003/0862* (2013.01); *C08L 25/06* (2013.01); *C08L 27/06* (2013.01); *C08L 27/16* (2013.01); *C08L 27/18* (2013.01); *C08L 33/08* (2013.01); *C08L 55/02* (2013.01); *C08L 63/00* (2013.01); *C08L 69/00* (2013.01); *C08L 77/00* (2013.01); *C08L 79/08* (2013.01); *C09D 7/61* (2018.01)

(56) References Cited

U.S. PATENT DOCUMENTS

| | | | |
|---|---|---|---|
| 8,293,378 B2 | 10/2012 | Owen et al. | |
| 2005/0252416 A1* | 11/2005 | Venturini | B82Y 30/00 |
| | | | 106/403 |
| 2007/0199478 A1* | 8/2007 | Schlegl | A61K 8/26 |
| | | | 106/404 |
| 2009/0317656 A1 | 12/2009 | Dai et al. | |

FOREIGN PATENT DOCUMENTS

| | | |
|---|---|---|
| CN | 102741369 A | 10/2012 |
| CN | 1027588201 A | 10/2012 |
| CN | 103205789 A | 7/2013 |
| CN | 104152898 A | 11/2014 |
| CN | 104364326 A * | 2/2015 |
| JP | 06001953 A * | 1/1994 |
| KR | 100845403 B1 | 7/2008 |

OTHER PUBLICATIONS

JP-06001953-A, Jan. 1994 (Year: 1994).*
Hussein, R.O., Production of Anti-Corrosion Coatings on Light Alloys . . . ), Mar. 14, 2014.

* cited by examiner

SOL-GEL HYBRID COATING COMPOSITION, COATING PROCESS AND COMPOSITE COATING LAYERS

BACKGROUND

Light metals such as magnesium, aluminum, zinc and alloys thereof have properties such as low density, high specific strength and easy processing which are needed in various applications such as aircrafts, electronic devices like portable devices, autos, etc. However, light metals such as magnesium alloys also have low surface hardness and low corrosion resistance and can not effectively meet requirements of these applications.

Micro-arc oxidation (MAO) is a surface treatment technique developed based on anodization technique. Through MAO treatment, a ceramic layer can grow in situ on the surface of a light metal substrate, and this ceramic layer has better hardness and better corrosion resistance.

Sol-gel coating is also a surface treatment which can impart new surface properties to a substrate, and practically, the sol-gel coating can be used to seal an anodization film so as to produce a layer with better chemical stability. Different sol-gel coating compositions and/or coating processes can produce layers with different properties and hence impart different surface properties to the light metal so as to effectively meet requirements in various applications.

DETAILED DESCRIPTION

Figure 1:
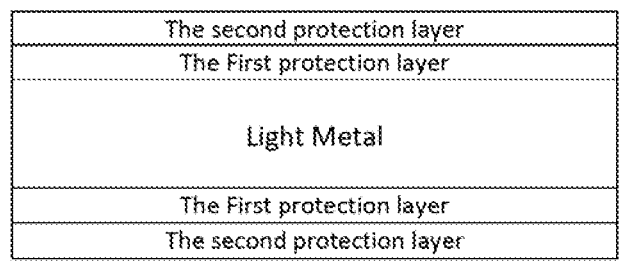
FIG. 1 is a schematic drawing of an example of composite coating layers.
Figure 2:
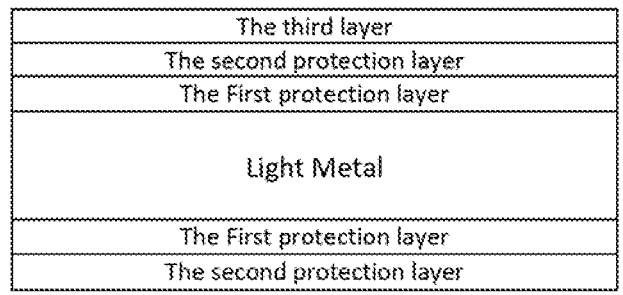
FIG. 2 is a schematic drawing of an example of composite coating layers.

When the word "a" or "an" is employed to describe element(s) or component(s) in this disclosure, it is done to give a general sense rather than to limit the number of the element(s) or component(s) and may mean not only singular but also plural elements or components.

When the word "comprise/comprising", "include/including" or "have/has/having" is employed in this disclosure, it is non-exclusive and may mean that further component(s) or element(s) can be included besides those listed.

When the word "consist of/consisting of" is employed in this disclosure, it is exclusive and may mean that no further initiative-added component(s) or element(s) can be included besides those listed.

When the word "about" is employed to define a number, it means to include a range of "the number±10% of the number".

When the word "room temperature" is employed in this disclosure, it means a temperature in a range of "25° C.±3° C.".

This disclosure is to provide a sol-gel hybrid coating composition comprising a sol-gel precursor, a polymer and a solvent, wherein the sol-gel precursor comprises tetraethyl orthosilicate (TEOS) and the polymer comprises polyurethane (PU) and polyacrylic. With the use of the sol-gel hybrid coating composition, a layer with high surface hardness, excellent chemical resistance and comfortable touching feeling can be produced.

The word "sol-gel precursor" used herein means a compound that can undergo a decomposition reaction such as alcoholysis or hydrolysis to form a sol, and then can undergo a gelation reaction such as condensation to form a gel.

The word "polyacrylic" used herein means a polymer containing a backbone of

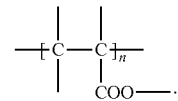

Besides TEOS, the sol-gel precursor can further comprise at least one selected from a group consisting of glycidoxypropyltriethoxysilane, 3-aminopropyltriethoxysilane, methacryloxypropyltrimethoxysilane, vinyltrimethylsiloxane, diphenyldimethoxysilane, and metal alkoxides.

The metal alkoxides can be represented by the formula $M(OR)_n$, wherein M represents a n-valent metal ion, R each independently represents an alkyl group and n can be an integer in a range of from 1 to 4. For example, the metal may be Al, Mg, Ti, Zr or Ce, and the alkyl group may be methyl, ethyl, n-propyl, iso-propyl, n-butyl, iso-butyl, tert-butyl, n-pentyl or neopentyl. As for examples of the metal alkoxides, mentioned may be aluminum isoproxide, titanium isoproxide and zirconium isoproxide.

The sol-gel precursor can be used in the sol-gel hybrid coating composition in an amount of from 5 wt % to 30 wt %, or 10 wt % to 20 wt %, or about 15 wt % based on total weight of the sol-gel hybrid coating composition.

The polyurethane useful herein can be any polyurethane prepared by reacting an isocyanate containing at least two isocyanate groups per molecule with a polyol containing on average at least two hydroxyl groups per molecule.

The isocyanate useful herein can be alkylene diisocyanates having 4 to 12 carbon atoms in the alkylene radical, such as dodecane diisocyanate, 2-ethyltetramethylene diisocyanate, 2-methylpentamethylene diisocyanate, tetramethylene diisocyanate and hexamethylene diisocyanate; cycloaliphatic diisocyanates such as cyclohexane diisocyanates, 1-isocyanato-3,3,5-trimethyl-5-isocyanatomethylcyclohexane (IPDI), hexahydrotolylene diisocyanate, dicyclohexylmethane diisocyanate; aromatic di- and polyisocyanates, such as tolylene diisocyanate, diphenylmethane diisocyanate, polyphenylpolymethylene polyisocyanates (crude MDI); or any mixtures thereof.

The polyol useful herein can be a monomeric polyol or a polyether polyol or a polyester polyol as long as it carries on average at least two hydroxyl groups per molecule.

The monomeric polyol that can be used herein may include aliphatic alcohols having from 2 to 4 OH groups per molecule, wherein the OH groups may be primary or secondary. Examples of suitable aliphatic alcohols include ethylene glycol, propylene glycol, isomeric butanediols, isomeric pentanediols, isomeric hexanediols, isomeric heptanediols, isomeric octanediol, 4,4'-dihydroxy-diphenylpropane, glycerol, trimethylolethane, trimethylolpropane and pentaerythritol.

The polyether polyol that can be used herein may include the reaction products of the above monomeric polyol with an alkylene oxide having, for example, 2 to 4 carbon atoms. Examples of the polyether polyol include the reaction products of ethylene glycol, propylene glycol, isomeric butanediols, isomeric hexanediols or 4,4'-dihydroxy-diphenylpropane or mixtures of two or more thereof with ethylene oxide, propylene oxide or butylene oxide or mixtures of two or more thereof; and the reaction products of glycerol, trimethylolethane, trimethylolpropane, pentaerythritol or mixtures of two or more thereof with the above listed alkylene oxides. The molecular weight ($M_w$) of the polyether polyol may be in a range of from about 100 to about 5,000, or from about 200 to about 3,000.

The polyester polyol that can be used herein may include the reaction products of the above monomeric polyol with caprolactone and the reaction products of the above monomeric polyol with a di- and/or tri-carboxylic acid. Examples of the di-carboxylic acid include adipic acid, succinic acid, maleic acid, fumaric acid, phthalic acid, isophthalic acid and terephthalic acid. Examples of the tri-carboxylic acid include citric acid and trimellitic acid. The molecular weight ($M_w$) of the polyester polyol may be in a range of from about 100 to about 5,000, or from about 200 to about 3,000.

Polyurethanes with any suitable molecular weight can be used herein, for example, a molecular weight ($M_w$) of from 2,000 to 60,000.

Commercial products of the polyurethane can also be used herein, examples of the commercial polyurethane include polyurethane resin UX-5100A, polyurethane resin 5617A, POLYMEG Polyol 2000 and Smooth-Cast 300.

The polyurethane may be used in the sol-gel hybrid coating composition in an amount of from 40 wt % to 70 wt % based on total weight of the sol-gel hybrid coating composition.

The polyacrylic useful herein can be represented by the following structure:

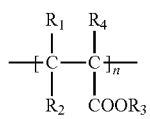

wherein $R_1$, $R_2$, $R_3$ and $R_4$ may be the same or different, and each independently represents hydrogen, an alkyl group or an aryl group. The alkyl group can be a methyl group, an ethyl group, a propyl group, a butyl group, a pentyl group or a hexyl group. The aryl group can be phenyl, benzyl, or xylyl. For example, $R_1$, $R_2$, $R_3$ and $R_4$ can be hydrogen simultaneously.

The polyacrylic with any suitable molecular weight can be used herein, for example, a molecular weight ($M_w$) of from 3,500 to 50,000.

Commercial products of the polyacrylic can also be used herein, and examples of the commercial polyacrylic include Dispex AA 4040 NS, ACUMER™ 1510, Plexiglas™ V045 and ACRYPLEN.

The polyacrylic may be used in the sol-gel hybrid coating composition in an amount of from 5 wt % to 20 wt % based on total weight of the sol-gel hybrid coating composition.

Besides the polyurethane and the polyacrylic, the polymer can further comprise at least one selected from a group consisting of polyimide, polyacetylene, polystyrene, polycarbonate, epoxy resin, fluoropolymers, poly(vinyl chloride), chlorinated poly(vinyl chloride), acrylonitrile-butadiene-styrene copolymer, polyamide, polypyrrole, polythiophene and polyfuran.

The fluoropolymers can be selected from a group consisting of poly(vinylidene fluoride), polytetrafluoroethylene, fluorinated olefin-based polymers, fluoroacrylates, fluorosilicone acrylates, fluorourethanes, perfluoropolyethers/perfluoropolyoxetanes, C1-C6 fluorotelomers, fluorosiloxane and fluoro UV polymers.

The polymer with any suitable molecular weight can be used herein as long as it can form a sol together with the sol-gel precursor.

The polymer that can be used herein except for the PU and the polyacrylic may be used in the sol-gel hybrid coating composition in an amount of from 0 wt % to 10 wt % based on total weight of the sol-gel hybrid coating composition.

The solvent useful herein can be at least one selected from a group consisting of ethers, acetates, ketones, alcohols, aromatics, aliphatic hydrocarbons and water.

The ethers useful herein can be ethers represented by the formula R—O—R', wherein R and R' each independently represents methyl, ethyl, n-propyl, iso-propyl, n-butyl, iso-butyl, tert-buty, n-pentyl, neopentyl, hexyl, phenyl, benzyl or cresyl. For example, diethyl ether, methyl propyl ether, ethyl propyl ether, ethyl butyl ether and propyl butyl ether may be mentioned.

The acetates useful herein can be methyl acetate, ethyl acetate, propyl acetate, butyl acetate, pentyl acetate and hexyl acetate.

The ketones useful herein can be ketones represented by the formula R—C(=O)—R', wherein R and R' each independently represents methyl, ethyl, n-propyl, iso-propyl, n-butyl, iso-butyl, tert-buty, n-pentyl, neopentyl, hexyl. For example, acetone, methyl ethyl ketone, diethyl ketone, methyl n-propyl ketone, methyl iso-propyl ketone, methyl butyl ketone, methyl pentyl ketone, ethyl n-propyl ketone, ethyl iso-propyl ketone, ethyl butyl ketone and ethyl pentyl ketone may be mentioned.

The alcohols useful herein can be monohydric alcohols, dihydric alcohols and trihydric alcohols. Examples of the alcohols can include ethanol, n-propyl alcohol, iso-propyl alcohol, n-butyl alcohol, iso-butyl alcohol, n-pentyl alcohol, neopentyl alcohol, ethylene glycol, propylene glycol, butylene glycol and glycerol.

The aromatics useful herein can be benzene, toluene, xylene, naphthalene, and phenylbenzene.

The aliphatic hydrocarbons useful herein can be hexane, heptane, octane, nonane and decane.

The total amount of the solvent used in the sol-gel hybrid coating composition can be from 15 wt % to 40 wt %, or 20 wt % to 35 wt %, or about 25 wt % based on total weight of the sol-gel hybrid coating composition.

The sol-gel hybrid coating composition can further comprise a metal powder and/or a pearl powder. The metal powder can be at least one selected from a group consisting of aluminum powder, silver powder, nickel powder, chromium powder and stainless steel powder.

The particles of the metal powder and/or the pearl powder can have any shapes such as sphere, flake, rods and the like and can have an average particle size of from 0.1 μm to 10 μm. The metal powder and/or the pearl powder can be present in the sol-gel hybrid coating composition in an amount of from 0.1 wt % to 10 wt % based on total weight of the composition.

Further, this disclosure is to provide a coating process, comprising: subjecting a light metal to micro-arc oxidation treatment to form a first protection layer on the light metal, and coating the sol-gel hybrid coating composition onto the first protection layer to form a second protection layer.

The light metal useful herein can be aluminum, aluminum alloy, magnesium, magnesium alloy, lithium, lithium alloy, zinc and zinc alloy.

Prior to the MAO treatment, the light metal can go through cleaning procedure so as to remove contaminants thereon, and/or polishing procedure so as to remove the oxide film thereon.

Electrolyte(s) useful in the MAO treatment can be sodium silicate, metal phosphate, potassium fluoride, sodium fluoride, potassium hydroxide, sodium hydroxide, fluorozirconate, sodium hexametaphosphate, ferric ammonium oxalate, phosphoric acid salt, polyethylene oxide, alkylphenolic ether, graphite powder, silicon dioxide powder, aluminum oxide powder, dispersant, metal powder, and combinations thereof.

The electrolyte(s) can present in an electrolyte solution in an amount of from 0.05 wt % to 15 wt % based on the whole electrolyte solution.

The electrolyte solution can be maintained at an alkaline condition, for example, pH>8, or pH>10, or pH>12.

The MAO treatment can be conducted in an alternating current manner at a voltage in a range of from 150 V to 450 V. If the voltage is too low, the layer is hardly obtained or unsatisfactory in the industry, but if the voltage is too high, the smoothness and density of the obtained layer decrease despite of a rather thick layer.

The voltage may be applied to pass the electrolyte solution for about 2-30 min, or 3-25 min, or 5-20 min. The voltage can be applied at a constant voltage value during the application time, or the voltage can also be applied in a value-changing manner such as continuous value-changing or discontinuous value-changing manner. As the time increases, the thickness of the first protection layer increases and the layer becomes smoother; however, if the time is too long, increase of the thickness slows down or stops.

The temperature during the MAO treatment can be maintained in a range of from 20° C. to 45° C. Current density of the MAO treatment can be in a range of from 2 A/cm$^2$ to 15 A/cm$^2$, or 3-12 A/cm$^2$, or 5-10 A/cm$^2$.

The thickness of the first protection layer can be in a range of from 2 μm to 20 μm, or 5-15 μm, or 7-14 μm.

A sol of the sol-gel hybrid coating composition can be prepared by dissolving all the components in the solvent in any suitable order, for example, firstly dissolving the polymer in the solvent then dissolving the sol-gel precursor thereto. If the polymer is a mixture, its ingredients can be added all in once or in any order without limitation. If the sol-gel precursor is a mixture, its ingredients can also be added all in once or in any order without limitation.

During the preparation of the sol from the sol-gel hybrid coating composition, the pH of the system can be controlled in a range of from pH 4 to pH 6. Carbonic acid, citric acid and/or polyacrylic acid can be used to adjust the pH value.

The sol can be coated onto the first protection layer obtained through the MAO treatment so as to form the second protection layer. The coating of the sol can be conducted at room temperature. The coating of the sol can be conducted through dip coating. During the dip coating, the substrate can be dipped into the sol and then dragged out slowly to ensure that a uniform film of the sol is formed on the first protection layer. The dip coating can be conducted for 1 or 2 or 3 times so as to obtain different thickness of the second protection layer while the thickness can also be controlled by the concentration of the sol. The dip coating can be conducted for less than 15 seconds each time. After the dip coating, the sol layer can be dried for example at a temperature in a range of from room temperature to 60° C. so as to form a gel and then the gel can go through a thermal treatment for example at a temperature in a range of from 50° C. to 150° C. or from 60° C. to 130° C. so as to form the second protection layer. The thermal treatment can be conducted for example for 20 min to 50 min, or 30 min to 40 min. The thickness of the second protection layer can be in a range of from 5 μm to 20 μm, or 5-15 μm.

Further, a metal powder and/or a pearl powder can be added and dispersed in the sol of the coating composition. The metal powder and/or the pearl powder can be added at any time during the preparation. In addition, the metal powder and/or the pearl powder can be made down with the dispersant before the addition into sol-gel hybrid composition. The metal powder and/or the pearl powder have the same definitions as defined above.

The coating process can further comprise coating the sol containing the metal powder and/or the pearl powder onto the second protection layer so as to impart a colorful or shining appearance to the light metal. The coating of the sol containing the metal powder and/or the pearl powder can be conducted through for example spray coating. The coating of the sol containing the metal powder and/or the pearl powder can be conducted at room temperature. The sol containing the metal powder and/or the pearl powder can be sprayed onto the second protection layer by any suitable spray coating device. There is no limitation on the spray coating as long as it can form a uniform layer. After the spray coating, the layer of the sol containing the metal powder and/or the pearl powder can be dried for example at a temperature in a range of from room temperature to 60° C. and then can go through a further thermal treatment for example at a temperature in a range of from 50° C. to 150° C., or from 60° C. to 130° C. so as to form a third layer. The thermal treatment can be conducted for example for 20 min to 50 min, or 30 min to 40 min. The thickness of the third layer can be in a range of from 5 μm to 30 μm, or 10-25 μm.

This disclosure is also to provide composite coating layers, for example, formed on the light metal, the composite coating layers can comprise a first layer obtained by micro-arc oxidation treatment, and a second layer obtained by dip coating with the sol-gel hybrid coating composition.

The composite coating layers can further comprise a third layer obtained by spray coating with the sol-gel hybrid coating composition containing the metal powder and/or the pearl powder.

EXAMPLES

Sol-Gel Hybrid Coating Compositions A1 to A4

Sol-gel hybrid coating compositions A1 to A4 having components shown as below in Table 1 were prepared into sols by dissolving the polymer and the precursor into the solvent at room temperature with stirring, adjusting the pH of the system with carbonic acid to about 5, and adding the metal powder (if any) at the last under stirring.

TABLE 1

| | components | A1 | A2 | A3 | A4 |
|---|---|---|---|---|---|
| precursor | TEOS | 15 wt % | 10 wt % | 10 wt % | 10 wt % |
| | Zirconium isoproxide | — | 5 wt % | 5 wt % | 5 wt % |
| polymer | Polyurethane (POLYMEG Polyol 2000) | 60 wt % | 60 wt % | 58.5 wt % | 60 wt % |
| | PMMA Dispex AA 4040 NS) | 5 wt % | 5 wt % | 5 wt % | 7.5 wt % |
| | Polytetrafluoroethylene (Teflon ® PTFE 7A) | | — | 1.5 wt % | |
| solvent | Isopropyl alcohol | 20 wt % | 20 wt % | 20 wt % | 17 wt % |
| Metal powder | Silver powder | No | No | No | 0.5 wt % |

Coating Process B1

A Mg alloy (MgAZ31B) was used as the metal substrate. The Mg alloy was firstly subjected to the MAO treatment with the following conditions: 300 V voltage for 5 minutes and 450 V voltage for 8 minutes, current density of 15 A/dm$^2$, electrolytes: sodium silicate, potassium hydroxide, fluorozirconate, aluminum oxide powder and phosphoric acid salt. The first protection layer with thickness of 12 μm was obtained.

The Mg alloy with the first protection layer formed thereon was dipped into the sol prepared from the coating composition A1 at room temperature for 3-5 seconds and then dragged out slowly, for example, at a speed of 10 cm/min. The layer of the coating composition A1 was dried at 60° C. for 10 min, then was subjected to the thermal treatment at 80° C. for 30 min so as to obtain the second protection layer with thickness of 7 μm.

Via the coating process B1, composite coating layers including the first layer of 12 μm and the second layer of 7 μm were obtained.

Coating Processes B2 and B3

In the coating processes B2 and B3, the MAO treatment was conducted in the same manner as that in the coating process B1. The coating compositions A2 and A3 were used in the coating processes B2 and B3 respectively, and the dip coating conditions were the same as those in the coating process B1.

Via the coating process B2, composite coating layers including the first layer of 12 μm and the second layer of 12 μm were obtained.

Via the coating process B3, composite coating layers including the first layer of 12 μm and the second layer of 9 μm were obtained.

Coating Process B4

The coating process B4 was conducted in the same manner as the coating process B2 except that the coating composition A4 was further applied to the second layer by spray coating to form a third layer. After the spray coating, the layer of the coating composition A3 was dried at 60° C. for 10 min, then was subjected to the thermal treatment at 80° C. for 30 min so as to obtain the third layer with thickness of 15 μm.

Via the coating process B4, composite coating layers including the first layer of 12 μm, the second layer of 12 μm and the third layer of 15 μm were obtained.

Properties Tests

Properties such as hardness and chemical resistance of the coatings were tested with the following methods.

1. Pencil Hardness Test

Pencil hardness of each coating surface obtained by the coating processes B1 to B4 respectively was tested according to ASTM D3363, the results shown as below in Table 2 were obtained:

TABLE 2

| Surface obtained via: | Result of pencil hardness test |
| --- | --- |
| Coating process B1 | 4H |
| Coating process B2 | 5H |
| Coating process B3 | 5H |
| Coating process B4 | 4H |

2. Chemical Resistance Test

In accordance with ASTM B136-84 and ASTM D5402, stain resistance and solvent resistance of each coating surface obtained by the coating processes B1 to B4 respectively were tested using the following substances, and the results showed that all coating surfaces obtained by the coating processes B1 to B4 can successfully pass the tests.

Ethanol (75%)
Cheese cloth (Mesh Grade 28×24; Grade 50 from testfabric.com): 300 mm×300 mm
Taper Linear Abraser with Crockmeter Kit (16 mm diameter acrylic rubbing finger) for sleeve pack testing and square kit
Lipstick
Coffee (Nestle 3 in 1) prepared as direction, 60° C.
Yellow Mustard
Water Soluble Ink
Wax Pencil (Black)
Red wine
Beer-Keineken
Regular Coca-Cola
Sunscreen-Coppertone, SPF15
Lotion-Nivea
Artificial Sweat (pH4.7&pH8.7).

The invention claimed is:

1. A sol-gel hybrid coating composition comprising a sol-gel precursor, a polymer mixture and a solvent, wherein the sol-gel precursor comprises tetraethyl orthosilicate and the polymer mixture comprises a polyurethane, a polyacrylic and a fluoropolymer.

2. The sol-gel hybrid coating composition according to claim 1, wherein the sol-gel precursor further comprises at least one selected from a group consisting of glycidoxypropyltriethoxysilane, 3-aminopropyltriethoxysilane, methacryloxypropyltrimethoxysilane, vinyltrimethylsiloxane, diphenyldimethoxysilane, and metal alkoxides.

3. The sol-gel hybrid coating composition according to claim 2, wherein the metal alkoxides are selected from a group consisting of aluminum isopropoxide, titanium isopropoxide and zirconium isopropoxide.

4. The sol-gel coating composition according to claim 1, wherein the polymer mixture further comprises at least one selected from a group consisting of polyimide, polyacetylene, polystyrene, polycarbonate, epoxy resin, poly(vinyl chloride), chlorinated poly(vinyl chloride), acrylonitrile-butadiene-styrene copolymer, polyamide, polypyrrole, polythiophene and polyfuran.

5. The sol-gel hybrid coating composition according to claim 1, wherein the fluoropolymer is selected from a group consisting of poly(vinylidene fluoride), polytetrafluoroethylene, fluorinated olefin-based polymers, fluoroacrylates, fluorosilicone acrylates, fluorourethanes, perfluoropolyethers/perfluoropolyoxetanes, C1-C6 fluorotelomers, fluorosiloxane and UV-curable fluoropolymers.

6. The sol-gel hybrid coating composition according to claim 1, wherein the solvent is at least one selected from a group consisting of ethers, acetates, ketones, alcohols, aromatics, aliphatic hydrocarbons and water.

7. The sol-gel hybrid coating composition according to claim 1, further comprising a metal powder and/or a pearl powder.

8. The sol-gel hybrid coating composition according to claim 7, wherein the metal powder is at least one selected from a group consisting of aluminum powder, silver powder, nickel powder, chromium powder and stainless steel powder.

9. A coating process, comprising: subjecting a light metal to micro-arc oxidation treatment to form a first protection layer on the light metal, and coating the sol-gel hybrid coating composition according to claim 1 onto the first protection layer to form a second protection layer.

10. The coating process according to claim 9, wherein the coating is conducted by dip coating.

11. The coating process according to claim 9, further comprising: coating the sol-gel hybrid coating composition according to claim 7 onto the second protection layer.

12. The coating process according to claim 11, wherein the coating is conducted by spray coating.

13. The coating process according to claim 9, wherein the light metal is selected from a group consisting of aluminum, aluminum alloy, magnesium, magnesium alloy, titanium and titanium alloy.

14. A layered composite coating, comprising: a first layer obtained by micro-arc oxidation treatment, and a second layer obtained by dip coating with the sol-gel hybrid coating composition according to claim 1.

15. The layered composite coating according to claim 14, further comprising a third layer obtained by spray coating with the sol-gel hybrid coating composition according to claim 7.

16. The sol-gel hybrid coating composition according to claim 1, wherein the fluoropolymer is polytetrafluoroethylene.

17. The sol-gel hybrid coating composition according to claim 1, wherein the polyurethane is present in an amount from 40 wt % to 70 wt % based on the total weight of the sol-gel hybrid coating composition and wherein the polyacrylic is present in an amount from 5 wt % to 20 wt % based on the total weight of the sol-gel hybrid coating composition.

18. The sol-gel hybrid coating composition according to claim 1, wherein the total amount of solvent in the sol-gel hybrid coating composition is from 15 wt % to 20 wt %.

19. The sol-gel hybrid coating composition according to claim 1, further comprising silver powder.

* * * * *